United States Patent Office 3,428,952

Patented Feb. 18, 1969

3,428,952

METHOD OF THERMALLY RECORDING, AND ELECTRICALLY RETRIEVING INFORMATION

Robert M. Gold, Brooklyn, N.Y., assignor to Keuffel & Esser Company, Hoboken, N.J., a corporation of New Jersey No Drawing. Filed Oct. 2, 1964, Ser. No. 401,211
U.S. Cl. 340—173 4 Claims
Int. Cl. G11b *13/00*

ABSTRACT OF THE DISCLOSURE

Selectively heating areas of a thermoplastic polymer layer above the glass transition temperature of the polymer and cooling the thus heated areas without disturbing the surface thereof creates corresponding invisible, non-deformed areas in the layer, which areas differ in their electrical properties from the unheated areas. The resulting pattern of different electrical properties in the layer may at a later time be sensed by a capacitive probe and will provide a read-out electrical signal which corresponds to the original thermal signal applied to the polymer layer.

This invention relates to methods and materials for recording information, and refers more particularly to thermoelectric systems for recording and retrieving information.

One of the major disadvantages of present information recording-and-storage technique is the fact that actual recording cannot be confirmed without time-consuming playback. The frequently results in expensive equipment to monitor the recording process in order to ascertain whether information is being recorded. Another disadvantage is the relatively high cost of magnetic recording tapes used for information storage. Careful coating methods and handling are required in order to avoid random drop-out of information bits.

The present invention overcomes these disadvantages by means of a thermoplastic layer with the capability of optical confirmation of information recorded. This confirmation may be temporary or permanent, and it permits certain recording of information without play-back. In addition, the thermoplastic layer is economical and simple to produce by conventional methods.

Therefore one object of the present invention is to provide methods and materials for recording, confirming, and retrieving information, which overcome the disadvantages of the prior art.

Another object is to provide methods for confirming the recording of information without immediate play-back.

Another object is to provide means for forming a developable latent image of the information recorded.

Another object is to provide materials suitable for such a system and which are capable of play-back at a later time.

Other objects will become apparent in the course of the following specification.

Briefly, the objects of the present invention may be realized by impressing information into a thermoplastic layer as a modulated thermal signal and sensing the heat-created information areas at the desired time by electrical means. To visually confirm the presence of recorded information, the layer is developed to render heat-affected areas visible or it is viewed under special optical circumstances. This confirmation may be temporary or permanent without affecting information retrieval.

The following examples are intended to illustrate the present invention and are not intended to limit the scope of the invention.

Example 1

A record sheet comprising a 0.5 mil layer of low-density polyethylene on super-calendered bleached kraft paper was placed on a master to form a sandwich. This was exposed to infrared radiation in a thermographic machine to form a latent image in the record sheet. Along one edge of the layer, a strip was developed by wiping with a 1% solution of azo oil blue-black dye in toluene. Regions corresponding to the master image were visually developed as a black positive to confirm the presence of the recorded information. It was possible also to produce a negative image.

The record sheet was then mounted on a sled for relative movement by two stations. At the first station, the sheet was charged by means of a corona discharge wire with a negative potential of 4,000 to 6,000 volts. The charged sheet was then moved by the second station where a capacitative probe sensed differences in charge corresponding to differences between imaged and non-imaged areas. The output from the probe was directed to a high-impedance electrometer and thence to a zero to one milliampere recorder. The trace of the recorder showed inflection points or variations corresponding to the heated and unheated regions of the record sheet. These variations corresponded to the master image. It was found that the results were much improved when the charged record sheet was allowed to equilibrate with its surroundings for a short while. It was also found that the results were reproducible at least 15 minutes later without recharging the record shet. The imaged polyethylene may be scanned electrically at a time long after the latent imaging with no loss in information.

Some suitable layers are cellulose acetate, nitrocellulose, polyvinyl chloride, polyethylene terephthalate, methoxy-methylated nylon 6 (nylon 8), nylon terpolymers of nylon 6, 6–6, and 6–10. When these polymer layers are rapidly heated above and cooled below their transition points, they exhibit a great hysteresis effect toward recrystallization so that there is an apparent freezing-in of a metastable state. This type of behavior appears common in polymer compositions which are plasticized, copolymerized, and the like, and which are thereby prevented from ready realignment of the molecules and subsequent crystallization. It is believed that the layer must be heated to at least the glass transition point of the thermoplastic material. In low density polyethylene, there are three glass transition points: —125° C., —21° C., and 87° C. It is believed that the 87° C. temperature is essential for the present method.

Example 2

A thermoplastic tape was moved on a mobile belt under a source of infrared radiation. The belt was infrared-absorbing and the infrared lamp was modulated on and off. The information signal to be recorded was directed to the infrared lamp through a modulated circuit to impress invisible heat markings on the tape as it moved by the lamp. The markings were read as above in Example 1.

It was found that the thermal signals were also recordable on the tape with a constant infrared source modulated by a Kerr cell shutter. The shutter modulated the actinic infrared radiation impinging on the moving tape. The tape was wiped with dye solution as in Example 1 to indicate the absence or presence of recorded latent information.

Confirmation may be temporary when an electrophotographic toner is used but not fixed. The tape may be charged before or after thermal imaging. The image tape was then read electrically as in Example 1. When a standard magnetic recording tape was used, as least two modes of recording information were available: the magnetic and the thermal modes.

For low-speed modulation of the heat source, a stylus may be thermally modulated. The stylus is in contact with the moving tape. The tape may also be imaged by a mechanically modulated hot stylus that is raised from and lowered to the tape. A laser beam is also suitable for impressing information into the thermoplastic material.

In another modification, the tape itself was infrared-absorbing due to infrared-absorbing matter imbedded in or coated on the tape. The tape may be self-supporting or supported.

The differences in electrical resistance were read also by means of ohmic contacts across the tape. Thus read-out capabilities were not limited to capacitative probes.

Example 3

A thermoplastic layer was heat-impressed with information as in Example 1. The layer was then examined under polarized light. Heat-impressed areas were found to be optically discernible by polarized light, and thus the presence of recorded information on the layer was confirmed without coloring the layer to obtain visible contrast. The heat-impressed layer was then electrically sensed as in Example 1 at a later time to reproduce the original information.

It is apparent that the above described examples are capable of many variations and modifications. All such variations and modifications are to be included within the scope of the present invention.

What is claimed is:

1. A method of thermally recording and electrically retrieving information, comprising the steps of:

selectively heating areas of a thermoplastic polymer layer by means of a thermal signal modulated according to said information to invisibly create corresponding areas of differing electrically sensible properties in said layer, said properties differing according to the heated and unheated areas of said layer; and thereafter electrically sensing the differences in electrical properties of said heated and unheated areas to produce a read-out signal corresponding to said information.

2. A method according to claim 1 wherein said electrical sensing step is accomplished by means of a capacitive probe.

3. A method according to claim 1 wherein said electrical sensing step comprises:

electrostatically charging the selectively heated layer; and sensing by means of a capacitive probe the electrostatic charge distribution on said layer.

4. A method of thermally recording and electrically retrieving information, comprising the steps of:

selectively heating areas of a solid thermoplastic polymer layer to at least the glass transition temperature of said polymer by means of a thermal signal modulated according to said information;

cooling said selectively heated areas to a temperature below said glass transition temperature without substantially disturbing the surface thereof, thereby creating in said layer invisible areas of differing electrical properties corresponding to said modulated signal, said properties differing according to the heated and unheated areas of said layer;

applying a uniform electrostatic charge to said layer, thereby forming an electrostatic charge distribution corresponding to said areas of differing electrical properties in said layer; and electrically sensing said charge distribution by means of a capacitive probe, thereby producing a read-out signal corresponding to said information.

References Cited

UNITED STATES PATENTS

| | | | |
|---|---|---|---|
| 3,072,742 | 1/1963 | Block | 340—173 |
| 3,175,196 | 3/1965 | Lee et al. | 340—173 |
| 3,195,110 | 7/1965 | Nail | 178—6.6 |
| 3,196,029 | 7/1965 | Lind | 250—65.1 |
| 3,210,466 | 10/1965 | Day | 340—173 |
| 3,247,493 | 4/1966 | Wolfe et al. | 340—173 |
| 3,256,481 | 6/1966 | Pulvari | 324—61 |

STANLEY M. URYNOWICZ, Jr., *Primary Examiner.*

J. F. BREIMAYER, *Assistant Examiner.*

U.S. Cl. X.R.

346—1; 250—65; 346—76